(12) United States Patent
Kent

(10) Patent No.: US 11,472,059 B2
(45) Date of Patent: Oct. 18, 2022

(54) SYSTEMS AND METHODS FOR ASSEMBLING FRAMING COMPONENTS

(71) Applicant: James Eugene Kent, Muscle Shoals, AL (US)

(72) Inventor: James Eugene Kent, Muscle Shoals, AL (US)

(*) Notice: Subject to any disclaimer, the term of this patent is extended or adjusted under 35 U.S.C. 154(b) by 0 days.

(21) Appl. No.: 17/516,442

(22) Filed: Nov. 1, 2021

(65) Prior Publication Data

US 2022/0153530 A1 May 19, 2022

Related U.S. Application Data

(60) Provisional application No. 63/113,272, filed on Nov. 13, 2020.

(51) Int. Cl.
*B27F 7/00* (2006.01)
*B65G 43/08* (2006.01)
*B65G 47/88* (2006.01)
*B27M 3/00* (2006.01)

(52) U.S. Cl.
CPC .......... *B27F 7/003* (2013.01); *B27M 3/0073* (2013.01); *B65G 43/08* (2013.01); *B65G 47/8861* (2013.01); *B65G 2201/0217* (2013.01); *B65G 2203/0233* (2013.01); *B65G 2203/043* (2013.01); *B65G 2203/047* (2013.01)

(58) Field of Classification Search
CPC ...... B27F 7/003; B27M 3/0073; B65G 43/08; B65G 47/8861; B65G 2201/0217; B65G 2201/0282; B65G 2203/0233; B65G 2203/043; B65G 2203/047
See application file for complete search history.

(56) References Cited

U.S. PATENT DOCUMENTS

| | | | | |
|---|---|---|---|---|
| 3,026,519 A * | 3/1962 | Johnson | ..................... | B27F 7/17 227/154 |
| 3,681,842 A * | 8/1972 | Blakeslee | ............ | B27M 3/0073 29/430 |
| 3,743,160 A * | 7/1973 | Bowers, Jr. | ............... | B27F 7/02 227/100 |
| 3,873,015 A * | 3/1975 | Whitaker | ................. | B23Q 7/06 227/100 |
| 4,039,112 A * | 8/1977 | Schultz | .................... | B27F 7/003 227/100 |
| 4,467,951 A * | 8/1984 | Pagano | ................ | B27M 3/0073 227/100 |
| 4,876,787 A * | 10/1989 | Ditty | ....................... | B27F 7/003 29/430 |
| 4,955,521 A * | 9/1990 | Michael | .................. | B27F 7/003 144/353 |
| 7,036,705 B1 * | 5/2006 | Fredrickson | ............ | B27F 7/006 227/39 |

* cited by examiner

*Primary Examiner* — Gene O Crawford
*Assistant Examiner* — Keith R Campbell
(74) *Attorney, Agent, or Firm* — Ryan J. Letson; Andrew Tuggle; Bradley Arant Boult Cummings LLP

(57) ABSTRACT

A system for assembling elements into framing components is provided along with a method for the use thereof. The system may comprise a frame, a fastening tool, a first conveyor, a second conveyor, and a holder. The pieces of the system may be connected so that they may operate automatically, with only minimal operation by a user. The system increases the speed, efficiency, precision, repeatability, and safety of assembling framing components.

20 Claims, 6 Drawing Sheets

SYSTEMS AND METHODS FOR ASSEMBLING FRAMING COMPONENTS

CROSS-REFERENCE TO RELATED APPLICATIONS

This application claims priority to U.S. Provisional Patent Application Ser. No. 63/113,272, titled "Systems and Methods for Assembling Framing Components" and filed on Nov. 13, 2020; the specification, drawings, and claims thereof are incorporated herein by reference.

FIELD OF INVENTION

This disclosure relates generally to the assembling of components for construction, and particularly to systems and methods for assembling framing components. Uses for this apparatus may include, but are not limited to: assembling components for use in framing constructions; increasing the speed and efficiency of assembling framing components; increasing the accuracy of assembling framing components; increasing the safety of assembling framing components; and providing an apparatus which can be used with little alteration to assemble a variety of types and configurations of framing components.

BACKGROUND

In the field of construction, the pieces of a building that give a structure support and shape are known as the "frame." When framing a house or other building, in addition to framing the walls and roof, many smaller structural components must be individually framed. These framing components include all or part of the framing components used to make corners, tees, windows (e.g., window jambs), and doors (e.g., door jambs). Framing components are assembled from elements (often wood, e.g., dimensional lumber) fastened together with a fastener (e.g., nails, screws, rivets, or brackets).

Framing components often are made of multiple pieces which must accurately fastened together. Their complexity often necessitates their being built by hand, one by one, and any given building could require many framing components be built. This leads to long construction schedules, high labor cost, low manufacturing accuracy and repeatability, and increased risk to human workers. A need exists to assemble framing components quickly, efficiently, precisely, repeatably, and safely. Additionally, in any given building, many of the framing components may be similar to each other. For example, in a building with uniform ceiling-heights and right-angled walls, each corner framing component could be similar. If doors are to be all the same height and width, then door framing components could all be similar, likewise for windows and tees. Consequently, an opportunity exists to ease the burdens associated with assembling framing components by providing a system and method for assembling elements into framing components repeatably.

The present disclosure describes systems and methods for increasing the speed, efficiency, repeatability, precision, and safety of known systems and methods for assembling framing components, for example by providing a system (and method of use thereof) which automatically, repeatably, and adjustably assembles framing components. Systems and methods for efficiency and safety are generally desirable.

SUMMARY OF THE INVENTION

The present disclosure describes a system for assembling framing components. In a first exemplary embodiment, a system for assembling framing components is disclosed, comprising: a frame; a first conveyor positioned on the frame and having a first end and a second end, wherein the first conveyor comprises a plurality of rollers and is configured to receive one or more elements and the one or more spacers, and wherein the first conveyor is configured to convey elements and one or more spacers from proximate the first end toward the second end; a holder positioned on the frame and proximate the first conveyor, wherein the holder is configured to temporarily fix the position of elements and the one or more spacers when the holder is actuated until the holder is released; a fastening tool positioned on the frame and proximate the first conveyor between the first end and the second end, wherein the fastening tool is configured to drive one or more fasteners into one or more elements in a predetermined fastener location and fastener attitude; and a control panel connected to the fastening tool.

In a second exemplary embodiment, a framing component assembler is disclosed, comprising: a frame; a fastening tool arranged on the frame, the fastening tool configured to drive one or more fasteners to assemble the framing component; a conveyor arranged on the frame, the conveyor configured to support the elements and to position the elements to receive the one or more fasteners from the fastening tool; a position sensor to sense a position on the conveyor of at least one element on the at least one conveyor; and a stopper coupled to the position sensor, wherein the stopper actuates to control movement of the elements on the conveyor based on a desired fastener location and the sensed position.

In a third exemplary embodiment, a method for assembling elements into a framing component is disclosed, comprising: determining, at a controller of a framing system, a desired position on a conveyor of at least one element, wherein the controller is coupled to a fastening tool, a position sensor, and a stopper; sensing, with the position sensor, a current position of at least one element on a conveyor; comparing the sensed position with a desired position of the at least one element, wherein the desired position is associated with a location on the at least one element where a fastening tool should drive one or more fasteners; actuating a holder to stop the at least one element if the sensed position is within a margin of the desired location or else to wait a period of time before comparing the sensed position with the desired position again, wherein the period of time is determined based on the sensed position and desired position; and actuating the fastening tool to drive the one or more fasteners after stopping the at least one element, wherein the fastening tool drives a fastener through a first location on an element, then the fastening tool drives a fastener through a second location on the element.

BRIEF DESCRIPTION OF THE DRAWINGS

The following drawings are attached to—and form a portion of—this disclosure.

DEFINITIONS

Figure 1:
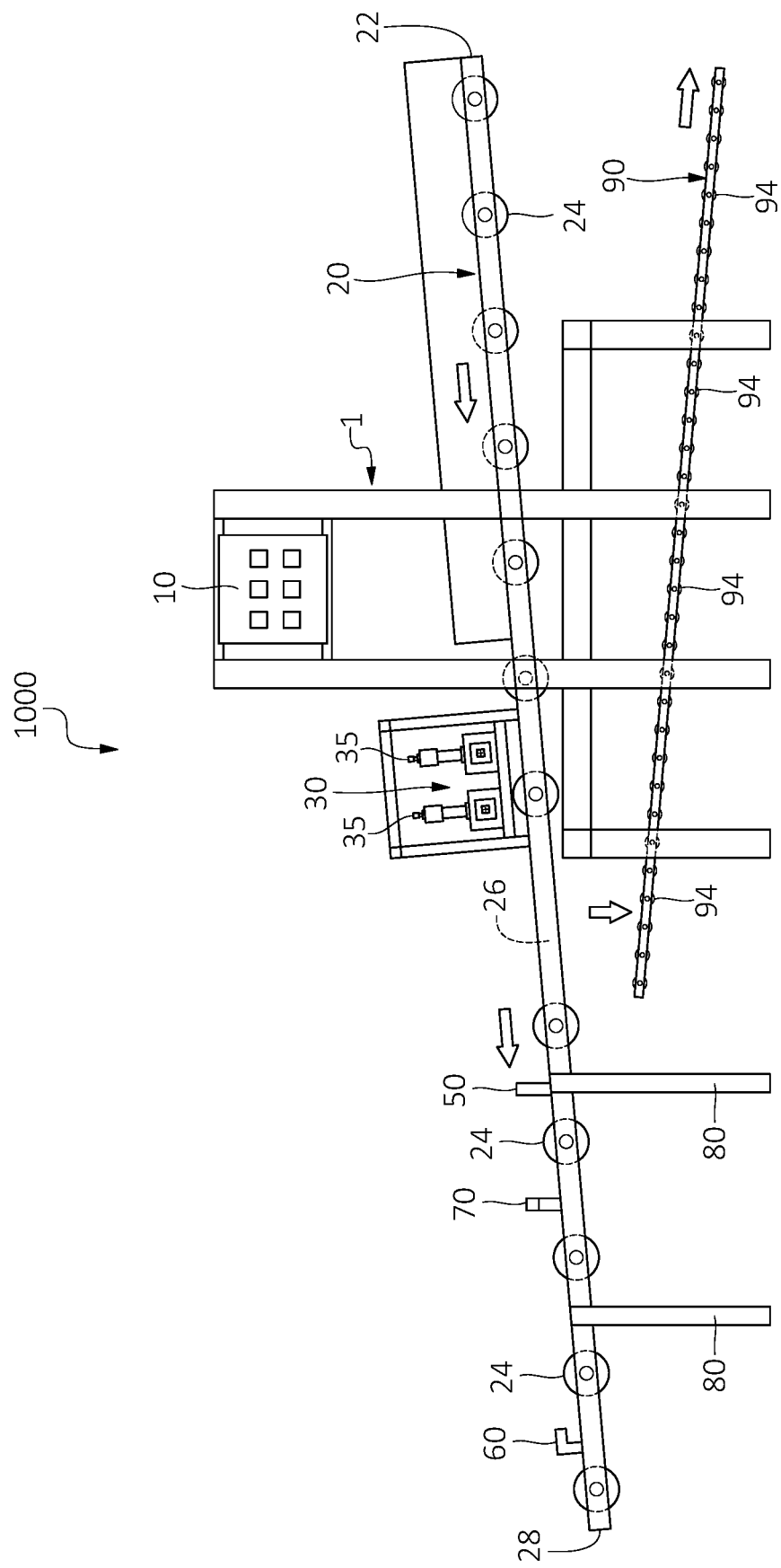
FIG. 1 is a side view of a framing component assembler in accordance with some embodiments of the present disclosure.

Unless otherwise defined, all terms (including technical and scientific terms) in this disclosure have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly defined otherwise in this disclosure. For brevity or clarity, well known functions or constructions may not be described in detail.

The terms "about" and "approximately" shall generally mean an acceptable degree of error or variation for the quantity measured in light of the nature or precision of the measurements. Typical, exemplary degrees of error or variation are within 20 percent (%), preferably within 10%, more preferably within 5%, of a given value or range of values. Numerical quantities given in this description are approximate unless stated otherwise, meaning that the term "about" or "approximately" can be inferred when not expressly stated.

The terminology used throughout the disclosure is for the purpose of describing particular embodiments only and is not intended to be limiting. The singular forms "a," "an," and "the" are intended to include the plural forms as well, unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

The terms "connected to," "in connection with," "in communication with," or "connecting" include any suitable connection or communication, including mechanical connection, electrical connection (e.g.: one or more wires), or signal-conducting channel (e.g., Bluetooth®, Near-Field Communication (NFC), or other inductive coupling or radio-frequency (RF) link).

The term "processor" may include one or more processors having processing capability necessary to perform the processing functions described herein, including but not limited to hardware logic, computer readable instructions running on a processor, or any suitable combination thereof. A processor may run software to perform the operations described herein, including software accessed in machine readable form on a tangible non-transitory computer readable storage medium, as well as software that describes the configuration of hardware such as hardware description language (HDL) software used for designing chips.

The term "signal" means any suitable signal, for example a voltage, a current, a duty cycle, a frequency of electrical oscillation, or a mechanical signal (e.g., pressure, vibration, a tap, or other mechanical signal) in some embodiments.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The following description illustrates and describes the processes, machines, manufactures, compositions of matter, and other teachings of the present disclosure. The disclosure shows and describes only certain embodiments of the processes, machines, manufactures, compositions of matter, and other teachings disclosed; but as mentioned above, it is to be understood that the teachings of the present disclosure are capable of use in various other combinations, modifications, and environments and are capable of changes or modifications within the scope of the teachings of this disclosure, commensurate with the skill and knowledge of a person having ordinary skill in the relevant art. The embodiments described are further intended to explain certain best modes known of practicing the processes, machines, manufactures, compositions of matter, and other teachings of the disclosure and to enable others skilled in the art to utilize the teachings of the disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

DETAILED DESCRIPTION

A system for assembling elements into framing components and a method for using a system for assembling elements into framing components have been developed and are described. In addition to the description in herein and in the accompanying drawings, the disclosures of U.S. Provisional Patent Application Ser. No. 63/113,272, titled "Systems and Methods for Assembling Framing Components" and filed on Nov. 13, 2020, are hereby incorporated by reference into the specification in its entirety. As shown in the drawings, we generally discuss embodiments of the system and methods for use with wooden framing components for the construction of houses. Variations could be advantageously used in many types of construction using other materials or for other structures (e.g., for use with steel framing for skyscrapers or for use with aluminum framing for boats). In other words, the teachings of this disclosure may be advantageous in other classes of construction, including other materials of construction and other buildings or crafts.

1. System; Frame

Figure 2:
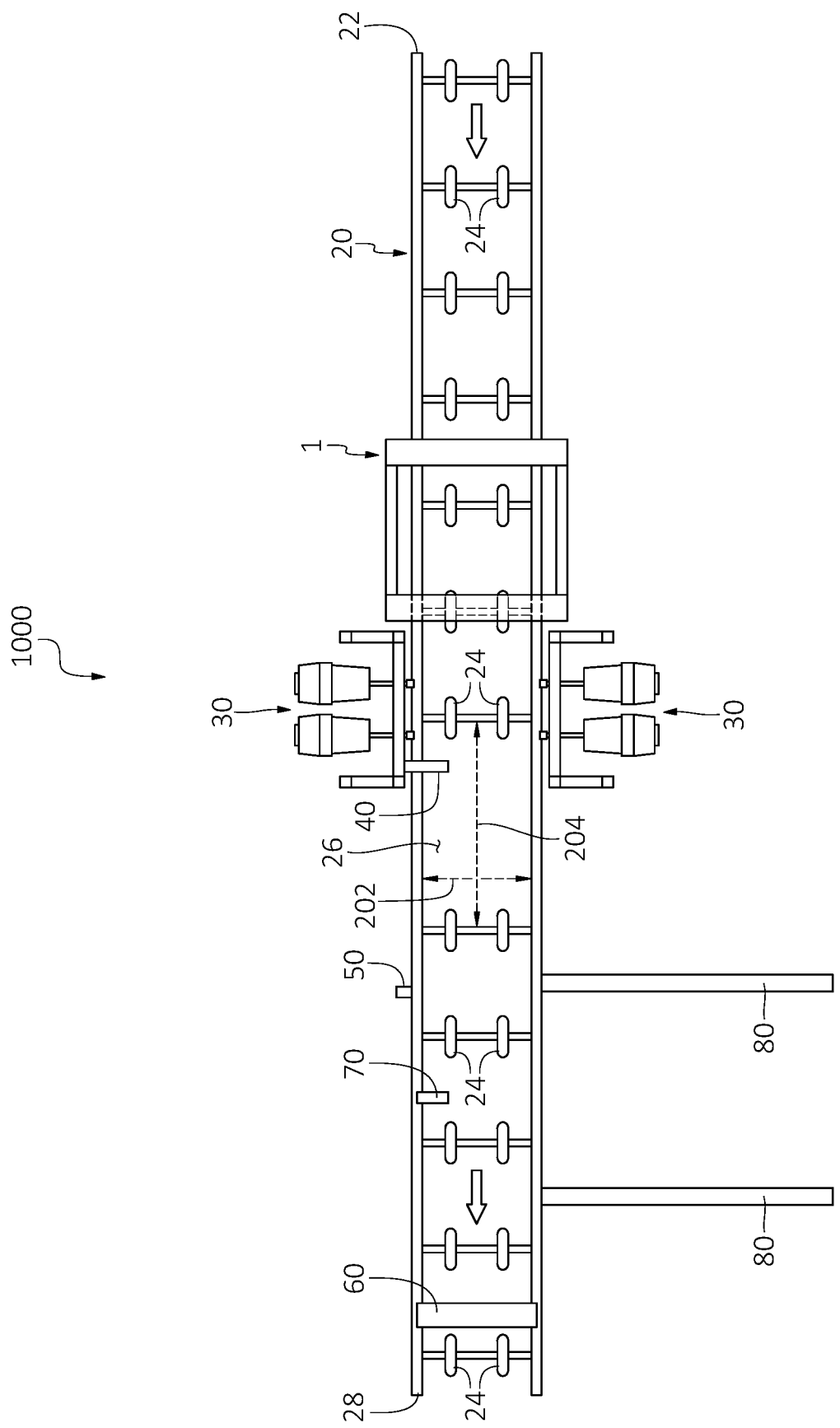
FIG. 2 is a top view of a framing component assembler in accordance with some embodiments of the present disclosure.
Figure 3:
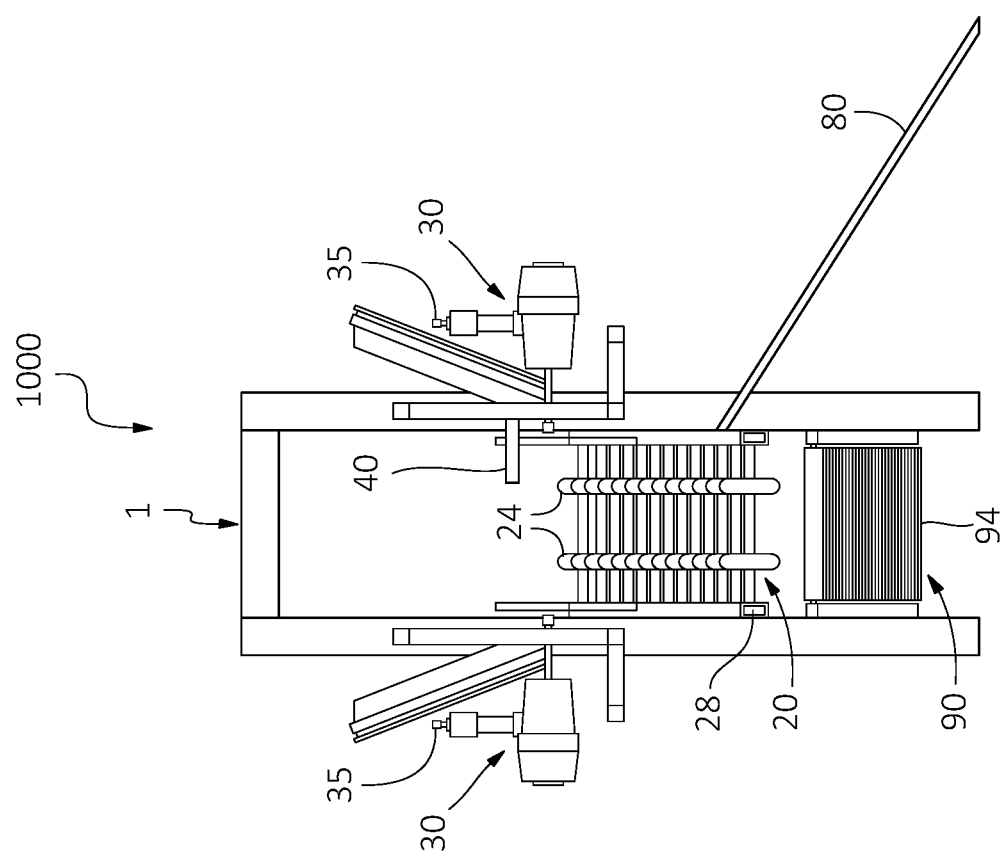
FIG. 3 is an end view of a framing component assembler in accordance with some embodiments of the present disclosure.

FIGS. 1-3 are three views of an embodiment of a system 1000 for assembling elements into framing components. The following detailed description is made with respect to FIGS. 1-3. Some parts of the system might be shown more clearly in one of the three figures than the others. FIGS. 1, 2, and 3 are a side view, a top view, and an end view (respectively) of a framing component assembler in accordance with some embodiments of the present disclosure.

The system 1000 also may be referred to herein as an "assembler" 1000 or "framing component assembler." In some embodiments, the various pieces (described in detail below) of the system 1000 may be assembled on a frame 1. The frame 1 may be any suitable frame. For example, in some embodiments, the frame 1 may be made of wood, metal, plastic, or any suitable material. The frame 1 may be configured such that the pieces of the system 1000 may be positioned to be substantially fixed in positions to achieve the utility described herein. As shown in FIG. 1, the frame 1 may be configured to stand on the ground. In other configurations, the frame 1 may be configured to be instead (or additionally) secured to a wall and/or ceiling. The frame 1 may be substantially rigid. Various pieces of the system 1000 may be connected to the frame 1 by any suitable connection, e.g., by screw, by glue, by nut-and-bolt, or by welding joint.

2. First Conveyor

In some embodiments, the system 1000 for assembling framing components may comprise a first conveyor 20 and a fastening tool 30. As shown in FIG. 1, the first conveyor 20 may be positioned on or arranged on the frame 1. The first conveyor 20 may be a gravity-fed conveyor. For example, as shown in FIG. 1, the first conveyor 20 may be inclined from a first end 22 to a second end 28, such that the first end 22 is higher than the second end 28. In some embodiments, the first conveyor 20 may be configured to support elements 2 (shown in FIGS. 4-6 and described in detail below) and to position elements 2 to receive one or more fasteners from the fastening tool 30. Elements on the conveyor 20 may travel in a direction on the conveyor based on an influence of gravity on the elements, without need for additional force to propel the elements. For example, in the embodiment of the figures, elements may travel from the first end 22 to or toward the second end 28 under influence of gravity (e.g., because the first end 22 is higher than the second end 28). In some embodiments, the first conveyor 20 may comprise a plurality of rollers 24.

Figure 4:
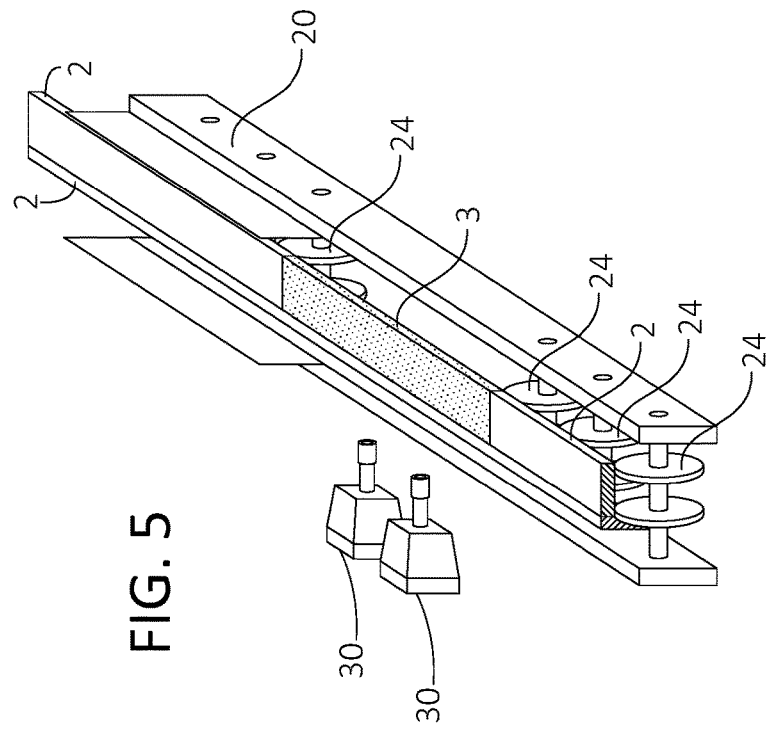
FIG. 4 is partial perspective view of a framing component assembler, including framing components for assembly in accordance with some embodiments of the present disclosure.
Figure 5:
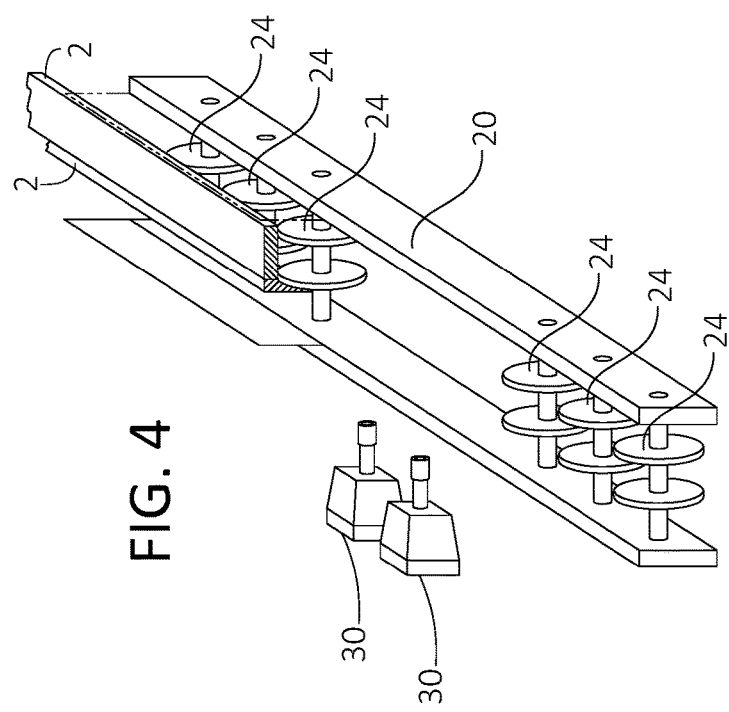
FIG. 5 is a partial perspective view of a framing component assembler, including framing components for assembly in accordance with some embodiments of the present disclosure.
Figure 6:
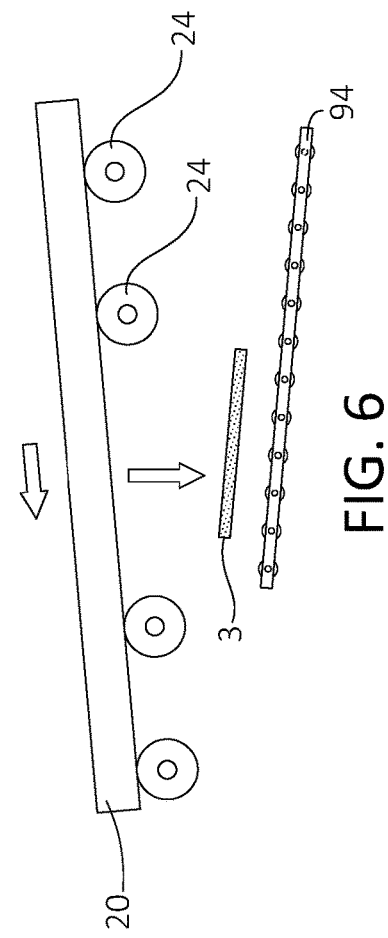
FIG. 6 is a partial side view of a framing component assembler, including framing components for assembly in accordance with some embodiments of the present disclosure.

Some embodiments of the system 1000 may be configured to accommodate elements 2 positioned using at least one spacer 3 (shown in FIGS. 4-6). A spacer 3 may be any suitable block of material for separating elements 2 by predetermined distances substantially along the first conveyor 20. For example, a spacer 3 may be a block of wood. In other embodiments, a spacer 3: may be made of metal or plastic; may have any suitable shape; and may be solid or hollow. In some embodiments, a spacer 3 may include a magnet or other sensed component of the position sensor 50.

The first conveyor 20 may be configured to convey elements 2 and spacers 3 from proximate the first end 22 to proximate the second end 28. In some embodiments the first conveyor 20 may be configured with the plurality of rollers 24 arranged substantially along a center axis of the first conveyor 20, with gaps between the rollers 24 and the sides of the first conveyor 20 for receiving elements 2 or spacers 3. In some embodiments, the first conveyor 20 may be configured to receive elements 2 and/or spacers 3 atop the rollers 24, for example substantially along the first conveyor 20 (as shown in FIG. 4).

In some embodiments of a method 9000 (shown in FIG. 7) for using the system 1000 for assembling elements into a framing component, a user might place elements 2 on the first conveyor 20. For example, as shown in FIGS. 4-6, a user might place elements 2 between the rollers 24 and the sides of the first conveyor 20, and also place elements 2 atop the rollers 24. In some embodiments of the method 9000, a user might also place spacers 3 on the first conveyor 20, such that the spacers 3 separate elements 2 from each other by a predetermined distance (i.e., the length of the spacer 3).

Note that, in some embodiments, the first conveyor 20 may have a width desired to accommodate various widths of framing components to be assembled using the system 1000. In some embodiments, rollers 24 of the conveyor 20 may be positioned to maintain an orientation of the elements 2 placed on the first conveyor 20, such as by having a surface profile that is complimentary to a surface profile of one or more elements 2, thereby keeping the elements 2 roughly in a position on the conveyor 20 in which they were placed by a user as they travel the length of the conveyor 20. In some embodiments, a width of the first conveyor 20 may be adjustable, so that a user can expand or contract sides of the conveyor 20 to accommodate varying widths of framing components for assembly by the system 1000. In some embodiments, the rollers 24 may have a variable position on respective axles about which the rollers 24 rotate on the conveyor, so that the rollers 24 may be positioned transversely on the conveyor 20 as desired to accommodate elements 2 when placed on the conveyor by a user. Yet other aspects of the conveyor 20 may be modified by a user as needed to accommodate elements 2 of various dimensions as needed in order to assemble a desired framing component.

3. Fastening Tool

In some embodiments, the fastening tool 30 may be positioned on (or arranged on) the frame 1 between the first end 22 and the second end 28. The fastening tool 30 may be configured to drive one or more fasteners (not specifically shown) to assemble elements 2 into framing components. The one or more fasteners may be any suitable fastener, such as a nail, a brad, a rivet, a bolt, a screw, a staple, or any other fastener. The fastening tool 30 may be any tool suitable for assembling elements 2 using the fasteners. The fastening tool 30 may be configured to drive a fastener at a predetermined fastener location and in a predetermined fastener attitude, so as to assemble elements 2 into a desired framing component. In some embodiments, the fastening tool 30 may comprise one or more nail guns (e.g., pneumatic nail guns connected to an air compressor (not specifically shown)).

In some embodiments of the system 1000, the first conveyor 20 may be configured to convey spacers 3 and elements 2 to a position proximate the fastening tool 30.

4. Holder

Some embodiments of the system 1000 may comprise a holder 40, sometimes referred to herein as a "stopper" 40. A holder 40 may be any device for temporarily fixing the position of elements 2 and spacers 3 as they are conveyed along the first conveyor 20. For example, the holder 40 may be configured to temporarily fix the position an element 2 in a predetermined position proximate the fastening tool 30, such as by contacting and applying a pressure to a first surface of the element 2 with a surface of the holder 40. A second surface of the element 2 may be in contact with the first conveyor 20. In this regard, the element 2 may be held between the holder 40 and the first conveyor 20 by the pressure applied by the holder 40. In this regard, a position of the element 2 on the conveyor 20 is fixed temporarily while the fastening tool 30 is actuated so that fasteners can be inserted at a desired, predetermined location and in a desired, predetermined attitude. In some embodiments, the holder 40 may comprise an electromechanical solenoid that may be actuated to extend or retract the holder 40. The extension or retraction can be based on a signal received from controller 350 via holder interface 316 (see FIG. 8). For example, the holder 40 may extend when an extension signal is received from the controller 350, and the holder 40 may retract when a retraction signal is received from the controller 350. In some embodiments, the holder 40 may comprise an electromechanical solenoid wherein the plunger (also known as the core, slug, or bolt) may be at least partially capped or covered with rubber, plastic, or felt (for example at the point which may contact a first surface of the element 2). In some embodiments, the holder 40 may be connected to the frame 1. In some embodiments, the holder 40 may be connected to the fastening tool 30. In some embodiments the holder 40 may be partially or substantially enclosed within a nailing chamber. In some embodiments, a catch may be positioned on the frame 1 or on the fastening tool 30 substantially beneath the holder 40 or nailing chamber to catch any pieces that might fall through. Such a catch might be, for example, a pan or basket made of metal, wood, or plastic. Although a single holder 40 may be depicted in the figures, it should be understood that various numbers of holders 40 can be present and implemented in some embodiments.

In some embodiments of the method 9000 for using the system 1000, a user may actuate the holder 40 to fix the position of at least one element 2 within the system. For example, a user may actuate the holder 40 when at least one element 2 is at a predetermined position such that when the fastening tool 30 is actuated, the fasteners are driven at a predetermined location and attitude. In some embodiments, the holder 40 may be actuated based on a sensed position of one or more elements 2 on the first conveyor 20.

5. Position Sensor

Some embodiments of the system 1000 may comprise a position sensor 40. The position sensor 50 may be configured to sense a position on the first conveyor 20 of at least one element 2 on the first conveyor 20. The position sensor 50 may be any suitable sensor. In some embodiments, the position sensor 50 may be a limit switch. In some embodiments, the position sensor 50 may be a proximity sensor, e.g., a magnetic proximity sensor. The position sensor 50 may be arranged in any suitable location with respect to the system 1000. The position sensor 50 may be positioned on the first conveyor 20. In some embodiments the position sensor 50 may be positioned in other places, for example on the frame 1 or on the fastening tool 30 or on the holder 40. In some embodiments, the position sensor 50 may be in two places. For example, a position sensor 50 that is a proximity sensor may have a sensing element positioned on the first conveyor 20 and a sensed element (e.g., a magnet) positioned on a spacer 3 or other moving piece.

In some embodiments, the position sensor 50 may be connected to the holder 40. The position sensor 50 and holder 40 may be connected and configured such that, if the position sensor 50 senses an element 2 in the predetermined position, then the holder 40 is actuated to fix the position of the element 2. In some embodiments the stopper 40 may be coupled with the position sensor 50. The stopper 40 may be configured to actuate to control movement of elements 2 on the first conveyor 20, for example based on a desired fastener location and the sensed position.

6. Triggers

In some embodiments, the fastening tool 30 may be connected to one or more triggers 35. The triggers 35 may, in some embodiments, be configured to actuate the fastening tool 30. The triggers 35 may be any device—e.g., mechanical, electrical, pneumatic, or a combination—suitable for actuating the fastening tool 30. For example the triggers 35 may be a solid-state relay device.

In some embodiments, the triggers 35 may be connected to the holder 50. In some embodiments, the triggers 35 may be configured to release the holder 40 after the fastening tool 30 has inserted fasteners into elements 2 at a predetermined location and attitude, for example at a fixed time after the fastening tool 30 is actuated. In some embodiments, the holder 40 may be configured to release at a set time after the holder 40 is actuated. In some embodiments, the holder 40 may be configured to release after the occurrence of some other event, e.g., after a quality-control assessment. In some embodiments the holder 40 may be manually releasable by a user.

In one embodiment of the method 9000 of using the system 1000, after the holder 40 releases, the elements 2 and spacers 3 continue to be conveyed by the first conveyor 20 toward the second end 28. If more fasteners are intended for assembling the elements 2 into the desired framing component, then the process by which the holder 40 is actuated and the fastening tool 30 is actuated and the holder 40 is released may be repeated, as many times as is necessary.

7. Opening; Second Conveyor

In some embodiments of the system 1000, the first conveyor 20 comprises an opening 26 proximate the second end 28. In some embodiments, the opening 26 may be configured to allow spacers 3—but not assembled elements 2 or framing components—to fall through the opening. The opening 26 may be rectangular and defined by an opening width 202 and an opening length 204. The opening width 202 and opening length 204 may be adjusted to receive the desired sizes and shapes of spacers 3 while not allowing elements 2 to fall through the opening 20. In some embodiments, the opening 26 may be an opening for receiving one or more spacers 3 positioned on the first conveyor 20 adjacent the at least one element 2.

In some embodiments, the system 1000 comprises a second conveyor 90. As shown in FIGS. 1-3, the second conveyor 90 may be positioned on or arranged on the frame 1. The second conveyor 90 may be a gravity-fed conveyor. For example, as shown in FIG. 1, the second conveyor 90 may be inclined substantially oppositely of the first conveyor 20. The second conveyor 90 may comprise a second plurality of rollers 94.

The second conveyor 90 may be configured to convey spacers 3 back to proximate the first end 22. In some embodiments, the second conveyor 90 may be configured to catch spacers 3 that fall from the first conveyor 20 through the opening 26. For example, the second conveyor 90 may be positioned beneath the first conveyor to receive the one or more spacers 3. In this way, spacers 3 may return to the beginning in order to be used with a new set of elements 2 to be assembled into a framing component.

Some embodiments of the method 9000 of using the system 1000 include manually moving spacers 3 from proximate the second end 28 to proximate the first end 22 for reuse.

8. Bumper; Offload Ramp; Offloader

In some embodiments, the first conveyor may have a bumper 60 positioned on or connected to the first conveyor 20. The bumper 60 may be configured to stop the movement of the assembled framing component along the first conveyor 20. In some embodiments, the system 1000 may comprise an offload ramp 80. The offload ramp 80 may be positioned on or connected to the first conveyor. In some embodiments, the offload ramp may be positioned on the frame 1. The offload ramp 80 may be configured for assembled framing components to be removed from the first conveyor 20.

In some embodiments, the system 1000 may further comprise an offloader 70. The offloader 70 may be any suitable mechanism for nudging assembled framing components off the first conveyor 20 and onto the offload ramp 80. For example, the offloader 70 may be a mechanical lever. In some embodiments, the offloader 70 may be connected to the position sensor 50. The offloader 70 may be actuated either based: on a position of the elements 2; or on a predetermined time after the fastening tool 30 is actuated; or on the occurrence of some other event (e.g., quality-control checking). The offloader 70 may in some embodiments be actuated based on a sensor in the bumper 60.

Some embodiments of the method 9000 of using the system 1000 include removing the assembled framing component from the first conveyor 20, e.g., from proximate the second end 28. In some embodiments of the method 9000, assembled framing components may be removed from the offload ramp 80.

9. Control Panel

Some embodiments of the system 1000 for assembling elements into framing components may include a control panel 10. The control panel 10 may be configured to receive user inputs and provide signals indicative of the inputs to a controller 350 (FIG. 8), via input/output interface 380 of the controller 350. The controller 350 can interpret the inputs and control the various resources of the system 1000 based on inputs received via the control panel 10. The controller 350 also can provide outputs to a user at the control panel 10 via the input/output interface 380. The control panel 10 may be connected to controller 350 via input/output interface 380, and thus may be configured to provide control inputs to any or all of the other pieces of the system 1000. For example, the control panel 10 may be connected to controller 350, to allow a user to provide inputs to the controller 350 to control (e.g., based on control logic 355) the position sensor 50, to the fastening tool 30, to the triggers 35, and/or to the holder 40. The control panel 10 may also be connected to the offloader 70. The control panel 10 may also be connected to the bumper 60. The control panel 10 may also be connected to various other components of the system 1000, e.g., a power supply (not specifically shown) or air compressors for the fastening tool 30 (not specifically shown).

In some embodiments, the control panel 10 is configured to allow a user to provide an input to cause the controller 350 to start and stop the system 1000. Some embodiments of the method 9000 of using the system 1000 include using the control panel 10 to start and stop the system 1000.

In some embodiments, the control panel 10 is configured to allow a user to perform manually one or more of the actions that might happen automatically (e.g., based on execution of control logic 355 by controller 350 using sensor data 365, without direct user inputs) in some embodiments. For example, the control panel 10 may allow a user to provide an input to actuate the holder 40, to actuate the fastening tool 30, to release the holder 40, to actuate the offloader 70, or to perform safety or quality-control functions. Some embodiments of the method 9000 of using the system 1000 include using the control panel 10 to perform some or all of these steps, or others not explicitly listed here.

10. Controller

Figure 8:
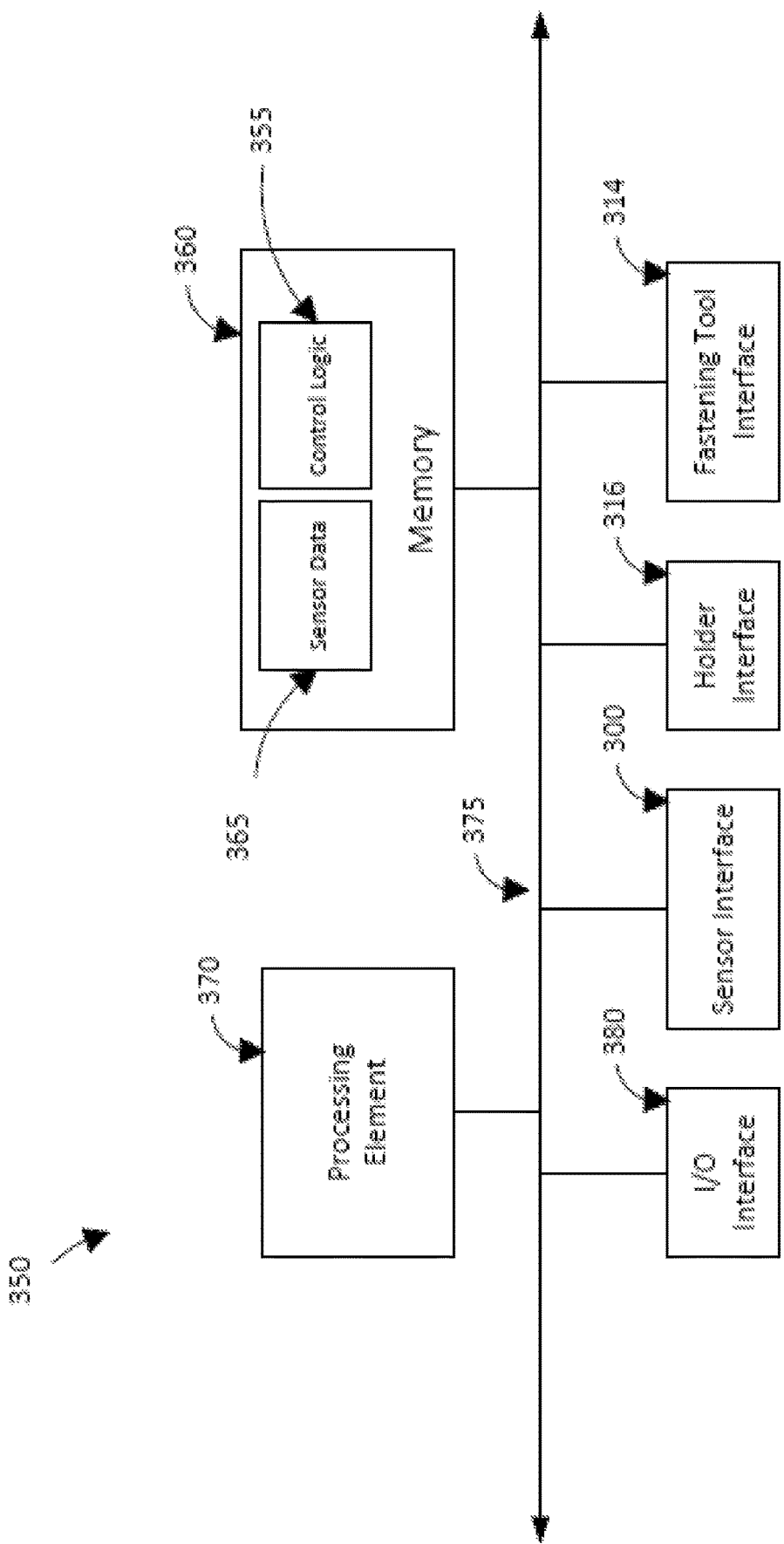
FIG. 8 is a depiction of a controller in accordance with some embodiments of the present disclosure.

FIG. 8 depicts an exemplary embodiment of a controller 350. The exemplary controller 350 depicted by FIG. 8 includes at least one conventional processing element 370, which includes processing hardware for executing instructions stored in memory 360. As an example, the processing element 370 may include a central processing unit (CPU) or a digital signal processor (DSP). The processing element 370 communicates with and drives the other elements within the controller 350 via a local interface 375, which can include at least one bus. In addition, the controller 350 comprises an input/output interface 380, for example a display screen, which can be used to output data to a user of the system 1000.

In some embodiments, the controller 350 may have an input/output interface 380, sensor interface 300, fastening tool interface 314, and holder interface 316. Other components are possible in other embodiments and may be present in the various embodiments of the system 1000 in order to achieve the functionality ascribed to the system 1000 herein.

The input/output interface 380 may include various components for receiving user inputs and for providing outputs to users. The input/output interface 380 can include various devices, and can be implemented in hardware, software, and various combinations thereof. In some embodiments, the input/output interface 380 can include one or more switches, buttons, touchscreens, knobs, dials, lights, and various combinations thereof. In some embodiments, the input/output interface 380 may be coupled to the control panel 10.

Sensor interface 300 may include various components to couple sensors of the system 1000, including position sensor 50 to the controller 350. The interface 300 can be configured to receive sensor data from the position sensor 50 (e.g., via wired or wireless communication, conductive communication, etc.) and provide it for storage in memory 360 as sensor data 365. In some embodiments, the controller 350 may be coupled communicatively to the position sensor 50 via sensor interface 300, for example, via conductive means or via short-range communication protocol, such as Bluetooth®.

Fastening tool interface 314 may be configured to couple the controller 350 to one or more fastening tools 30 and triggers 35 to allow the controller 350 to control operations of the fastening tool 30 and triggers 35 and to facilitate exchange of data between the controller 350 and fastening tool 30 and triggers 35. As an example, the controller 350 may receive signals indicative of an actuation of the fastening tool 30 by a trigger 35, capacity of the fastener tool 30 (e.g., a number of remaining fasteners, etc.), or other information. The controller 350 can provide an actuation signal to actuate one or more triggers 35. The interface 314 can be configured to communicate with fastening tools 30 and triggers 35 via wired or wireless communication, although in the embodiment of the figures, the fastening tools 30 and triggers 35 are conductively coupled to the controller 350.

Holder interface 316 may be configured to communicate signals to actuate the holder (or stopper) 40. The holder interface 316 may be configured to allow the controller 350 to control operations of the holder 40, such as based on a determined position of elements 2 compared with a desired position of the elements 2 for driving a fastener into the elements 2 at a desired location. The interface 316 can be configured to communicate with holder 40 via wired or wireless communication, although in the embodiment of the figures, the holder 40 is conductively coupled to the controller 350.

Memory 360 may be a tangible storage medium. Examples of tangible (or non-transitory) storage medium include disks, thumb drives, hard drives, and other forms of memory. Tangible computer readable storage medium include volatile and non-volatile, removable and non-removable media, such as computer readable instructions, data structures, program modules or other data. Examples of such media include RAM, ROM, EPROM, EEPROM, flash memory, disks or optical storage, magnetic storage, or any other non-transitory medium that stores information.

The controller 350 includes control logic 355 for generally controlling the operation of the system 1000 when executed by the controller 350. The control logic 355 may include instructions, logic, and various combinations thereof that, when executed by the controller 355 (i.e., the processing element), cause the controller 355 to control resources of the system 1000 to perform some or all of the functionality ascribed herein to the system 1000. The control logic 355 may be implemented in software, hardware, firmware, or any combination thereof. In the exemplary controller 350 illustrated by FIG. 8, the control logic 355 is implemented in software and stored in memory 360 of the controller 350. Note that the control logic 355, when implemented in software, can be stored and transported on any computer-readable medium for use by or in connection with an instruction execution apparatus that can fetch and execute instructions.

The controller 350 further comprises sensor data 365 stored in memory 360 that includes information (i.e. measurements) received from sensors of the system 10 (e.g., position sensor 50) to which the controller 350 is coupled via sensor interface 300. The sensor data 365 may include data from the sensor 50 that is indicative of a position of one or more of the elements 2 on the first conveyor 20, although in some embodiments, the sensor data 365 may include various other information received from sensors coupled to any of the various resources of the system 1000 described herein and configured to sense aspects of the resource (e.g., operating status, capacity, such as a number of fasteners left in a cartridge feeding a fastening tool 30, etc.). The sensor data 365 can include other data from yet other sources in other embodiments.

11. Illustrative Example

As an exemplary operation of the system 1000, a user may place elements 2 onto the first conveyor 20 and advance the elements 2 along the first conveyor 20. The first conveyor 20 may be a gravity-fed conveyor and may also comprise a plurality of rollers and an opening for receiving one or more spacers 3. The position sensor 50 may sense a current position of the elements 2 and provide a sensed position to the controller 350, which may be stored as sensor data 365. The position sensor 50 may also sense a current position of one or more spacers 3, which may be positioned adjacent to the elements 2. Control logic 355 may note the current sensed position of the element 2 and may compare it with a desired location. The desired location of the element 2 may be a position corresponding to a location on the first conveyor 20 where the element 2 is positioned to receive one or more fasteners at one or more desired locations on the element 2 from the fastening tool 30. The controller 350 may then execute control logic 355 to actuate the stopper 40 (which may be coupled to the position sensor 50) to stop the elements 2 if the current sensed position is within a margin of the desired location or else to wait a period of time before comparing the current position with the desired position again. The period of time may be determined based on the current position and desired position. The controller 350 may further execute control logic 355 to actuate the fastening tool 30 to drive the one or more fasteners after stopping the elements 2, for instance to assemble a framing component. The controller 350 may execute control logic 355 to release the stopper 40 and allow the elements 2 to advance along the first conveyor 20. The spacers 3 may then drop through the opening onto a second conveyor 90 positioned substantially beneath the first conveyor 20 to receive one or more spacers 3. The second conveyor 90 may be a gravity-fed conveyor.

FIGS. 4, 5, and 6 are partial perspective views of a framing component assembler, including framing components for assembly in accordance with some embodiments of the present disclosure. FIGS. 4-6 show a portion of the system 1000 during different steps of the process used in method 9000. In FIG. 4, the elements 2 have been placed on the rollers 24. In FIG. 5, the elements 2 and spacer 3 have advanced along the first conveyor, and the spacer 3 is momentarily above the opening 26. FIG. 6 is a side view showing the spacer 3 having fallen through the opening 26 onto or towards the second conveyor 90.

12. Reconfiguration

In some embodiments of the system 1000 for assembling elements into framing components, the particular configuration of pieces of the system 1000 is reconfigurable by a user. Some embodiments of the system 1000 allow the fastening tool 30, the holder 40, the frame 1, and the first conveyor 20 to be re-positioned and re-oriented to accommodate assembling a variety of different framing components.

13. Method

Figure 7:
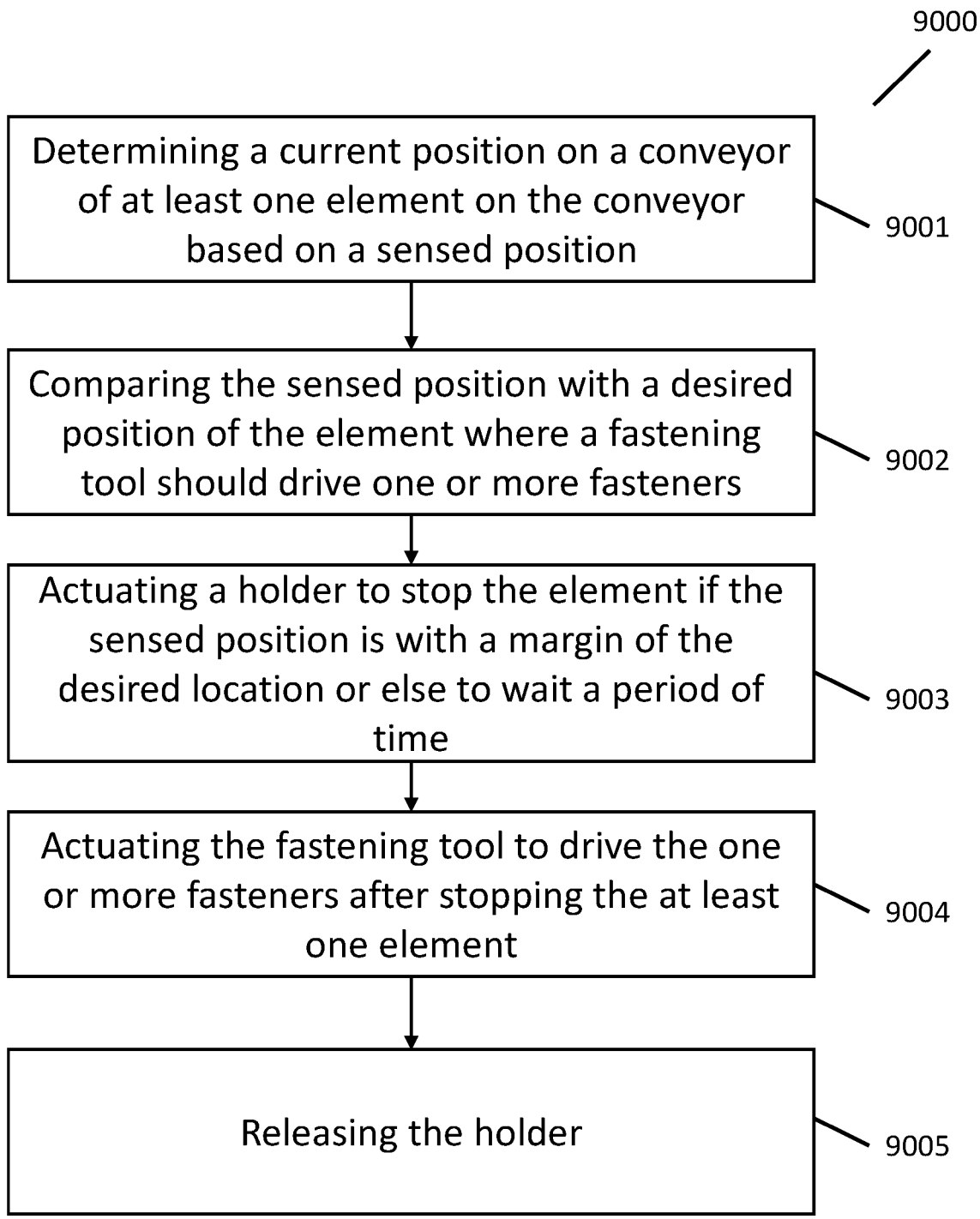
FIG. 7 is a depiction of a method of using a framing component assembler in accordance with some embodiments of the present disclosure.

FIG. 7 is a depiction of a method 9000 of using a framing component assembler in accordance with some embodiments of the present disclosure. Step 9001 comprises determining a current position on a conveyor of at least one element on the conveyor based on a sensed position. Step 9002 comprises comparing the sensed position with a desired position of the element where a fastening tool should drive one or more fasteners. Step 9003 comprises actuating a holder to stop the element if the sensed position is within a margin of the desired location or else to wait a period of time. Step 9004 comprises actuating the fastening tool to drive the one or more fasteners after stopping the at least one element. Step 9005 comprises releasing the holder.

While the foregoing specification has described specific embodiments of this invention and many details have been put forth for the purpose of illustration or example, it will be apparent to one skilled in the art that the invention is susceptible to additional embodiments and that certain of the details described herein can be varied considerably without departing from the basic principles of the invention.

What is claimed is:

1. A system for assembling elements into a framing component, comprising:
    a frame;
    a first conveyor positioned on the frame and having a first end and a second end, wherein the first conveyor comprises a plurality of rollers and is configured to receive one or more elements and one or more spacers, and wherein the first conveyor is configured to convey the one or more elements and the one or more spacers from proximate the first end toward the second end;
    a holder positioned on the frame and proximate the first conveyor, wherein the holder is configured to temporarily fix the position of the one or more elements and the one or more spacers when the holder is actuated until the holder is released;
    a fastening tool positioned on the frame and proximate the first conveyor between the first end and the second end, wherein the fastening tool is configured to drive one or more fasteners into the one or more elements in a predetermined fastener location and fastener attitude;
    a control panel connected to the fastening tool;
    one or more triggers connected to the fastening tool, wherein the one or more triggers is configured to actuate the fastening tool; and
    a position sensor connected to the one or more triggers, wherein the position sensor is configured to sense a position of one or more of the one or more elements and the one or more spacers, wherein the position sensor is configured to actuate the holder, and
    wherein the position sensor is configured to activate one or more of the one or more triggers.

2. The system of claim 1, wherein the fastening tool comprises at least one nail gun.

3. The system of claim 1, wherein the position sensor is a limit switch.

4. The system of claim 1, wherein the holder is connected to the one or more triggers and is configured to release a predetermined time after the fastening tool is actuated.

5. The system of claim 4, wherein the holder is a holding solenoid.

6. The system of claim 4, wherein the position sensor is a magnetic proximity sensor, and wherein the one or more spacers comprises at least one magnet.

7. The system of claim 4, wherein the position sensor is a limit switch.

8. The system of claim 4, wherein the one or more triggers comprises a solid-state relay.

9. The system of claim 4, wherein the fastening tool comprises at least one nail gun.

10. The system of claim 4, further comprising a second conveyor proximate the first conveyor.

11. The system of claim 10, wherein the second conveyor is positioned the substantially below the first conveyor, and wherein the first conveyor further comprises an opening configured such that the one or more spacers can fall through the opening onto the second conveyor.

12. The system of claim 4, further comprising:
    a bumper positioned on the first conveyor proximate the second end, wherein the bumper is configured to stop the movement of an assembled framing component along the first conveyor;
    an offload ramp proximate the first conveyor; and
    an offloader positioned on the first conveyor, wherein the offloader is configured to move the assembled framing component off the first conveyor onto the offload ramp when the offloader is actuated.

13. A framing component assembler, comprising:
    a frame;
    a fastening tool arranged on the frame, the fastening tool configured to drive one or more fasteners to assemble a framing component;
    a conveyor arranged on the frame, the conveyor configured to support elements and to position the elements to receive the one or more fasteners from the fastening tool;
    a position sensor to sense a position on the conveyor of at least one of the elements on the conveyor; and
    a stopper coupled to the position sensor, wherein the stopper actuates to control movement of the elements on the conveyor based on a desired fastener location and the sensed position;
    wherein the conveyor is a first conveyor comprising a plurality of rollers and an opening for receiving one or more spacers positioned on the first conveyor adjacent to the at least one element.

14. The assembler of claim 13, wherein the fastening tool comprises at least one nail gun.

15. The assembler of claim 13, further comprising a second conveyor positioned beneath the first conveyor to receive the one or more spacers.

16. The assembler of claim 15, wherein the first conveyor and second conveyor are gravity-fed conveyors.

17. A framing component assembler, comprising:
    a frame;
    a fastening tool arranged on the frame, the fastening tool configured to drive one or more fasteners to assemble a framing component;
    a conveyor arranged on the frame, the conveyor configured to support elements and to position the elements to receive the one or more fasteners from the fastening tool;
    a position sensor to sense a position on the conveyor of at least one of the elements on the conveyor, wherein the position sensor is configured to sense a position of one or more spacers positioned adjacent to the at least one element;
    a stopper coupled to the position sensor, wherein the stopper actuates to control movement of the elements on the conveyor based on a desired fastener location and the sensed position; and
    a controller coupled to the fastening tool, the position sensor, and the stopper, wherein the controller executes logic stored in memory to:

determine a current position on the conveyor of at least one of the elements on the conveyor based on the sensed position;

compare the sensed position with a desired position of the at least one element, wherein the desired position is associated with a location on the at least one element where the fastening tool should drive the one or more fasteners;

actuate the stopper to stop the at least one element if the current position is within a margin of the desired location or else to wait a period of time before comparing the current position with the desired position again, wherein the period is determined based on the current position and desired position; and actuate the fastening tool to drive the one or more fasteners after stopping the at least one element.

18. The assembler of claim 17, wherein the fastening tool comprises at least one nail gun.

19. The assembler of claim 17, wherein the position sensor is a magnetic proximity sensor, and wherein the one or more spacers comprises at least one magnet.

20. The assembler of claim 17, wherein the position sensor is a limit switch.

* * * * *